July 24, 1934.   P. WEISS   1,967,796
CASTING OR MOLDING MACHINE
Filed Nov. 22, 1933
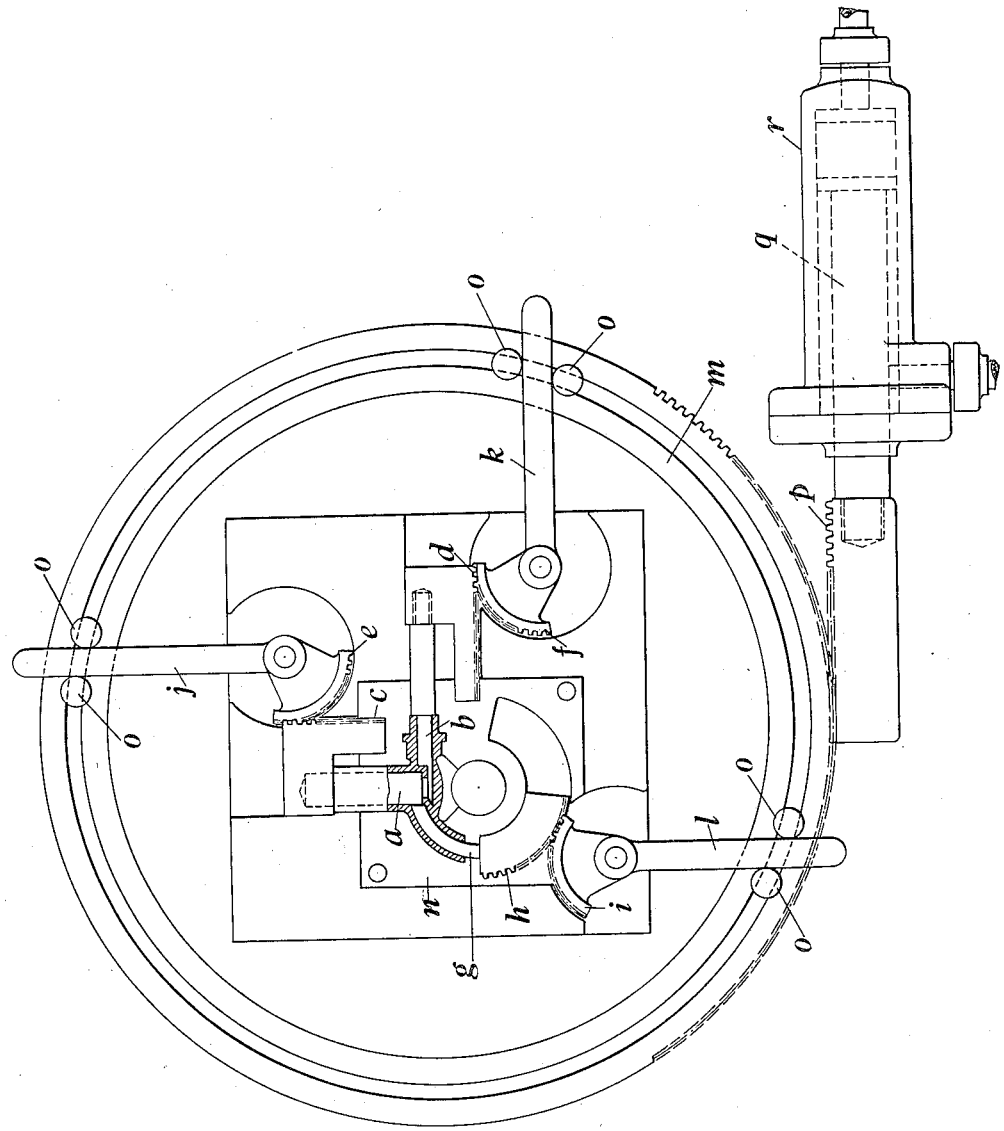
P. Weiss
INVENTOR
By: Marks & Clerk
Attys.

Patented July 24, 1934

1,967,796

UNITED STATES PATENT OFFICE 1,967,796

CASTING OR MOLDING MACHINE

Paul Weiss, Nuremberg, Germany, assignor to Galex Die Casting Limited, Halesowen, near Birmingham, England Application November 22, 1933, Serial No. 699,268
In Great Britain November 10, 1932

2 Claims. (Cl. 22—93)

This invention relates to the machines employed in the die casting of metals or in the molding of plastic substances under the action of heat and pressure. The object of the invention is to provide improved means for advancing and withdrawing the cores or other movable parts of complex molds which require to be withdrawn before the cast or molded article can be removed from the mold.

The invention comprises a single rotary operating member which is suitably connected to each of the movable parts of the die through any convenient intermediate mechanism so that the advancing of the movable parts into position and the withdrawing of the same is effected by actuation of the one operating member.

The accompanying drawing shows diagrammatically one manner of carrying the invention into effect for the manufacture of the body parts of water taps.

Referring to the diagram, each of the movable core parts as $a$, $b$, which is adapted to be actuated by a sliding movement is associated with a short rack $c$, $d$, engaging a toothed segment $e$, $f$. The part (or parts) as $g$ which is actuated by an angular movement is associated with a segmental rack $h$ engaging a toothed segment $i$. Each of the toothed segments is connected to a lever $j$, $k$, $l$, and the levers are all engaged by a single outer rotary ring $m$ which surrounds the mold $n$ in which the casting or molding is to be effected. The connection between the ring $m$ and levers $j$, $k$, $l$, is provided in any convenient manner, as for example, by means of adjustable projections $o$ on the ring engaging opposite sides of the various levers. The advancing of all the movable parts into the proper relationship prior to the casting or molding operation is effected by the single act of rotating the ring aforesaid in one direction, and the reverse movement of the movable parts is effected by the reverse rotation of the ring. The ring may be formed with teeth for engagement by a rack $p$ which may be actuated by a fluid operated piston $q$ in a cylinder $r$ for oscillating the ring.

Whilst it is convenient for most purposes to employ a ring as the single operating member, my invention is not limited thereto as any equivalent device such as a rotatable disc or a system of radial arms which are joined together and are rotatable about a common axis, may be used, these and other details being varied to suit different requirements, but in all cases the movable parts of the mold or die are actuated by one and the same rotary operating member.

Having thus described my invention what I claim as new and desire to secure by Letters Patent is:—

1. In a molding machine, the combination of a die with a plurality of core parts reciprocative to and from the common center of the die, rack and gear mechanisms for reciprocating said core parts with each mechanism including an actuating lever and with the levers of the several mechanisms diverging outwardly from the common center of the assembled parts, a ring encircling the assembled parts with the diverging levers extending across the perimeter of the ring, and means connecting the levers with the ring so that oscillation of the ring actuates the levers.

2. In a molding machine, a molding mechanism as claimed in claim 1, characterized by the fact that the perimeter of the ring is provided with a gear segment, a rack engages the gear segment, and a motor reciprocates the rack to oscillate the ring to actuate the levers.

PAUL WEISS.